(12) United States Patent
Friddell et al.

(10) Patent No.: US 7,090,167 B2
(45) Date of Patent: Aug. 15, 2006

(54) METHOD AND APPARATUS FOR LIQUID CONTAINMENT, SUCH AS FOR AIRCRAFT FUEL VESSELS

(75) Inventors: Stephen D. Friddell, Seattle, WA (US); Alan K. Prichard, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 11/165,933

(22) Filed: Jun. 24, 2005

(65) Prior Publication Data

US 2005/0274848 A1  Dec. 15, 2005

Related U.S. Application Data

(62) Division of application No. 10/278,585, filed on Oct. 22, 2002, now Pat. No. 6,910,659.

(51) Int. Cl.
*B64C 3/26* (2006.01)
*B64D 37/05* (2006.01)

(52) U.S. Cl. .............................. 244/123.1; 244/123.6; 244/135 R

(58) Field of Classification Search ............ 244/135 R, 244/123; 428/116
See application file for complete search history.

(56) References Cited

U.S. PATENT DOCUMENTS

| | | | |
|---|---|---|---|
| 1,616,008 A | 2/1927 | Stout | |
| 1,835,370 A | 12/1931 | Bellanca | |
| 2,240,310 A | 4/1941 | McKay | |
| 2,387,708 A | 10/1945 | Arnhym | |
| 2,850,083 A | 9/1958 | Frost | |
| 3,096,054 A | 7/1963 | Ciminaghi | |
| 3,097,982 A | 7/1963 | Stoner | |
| 3,145,000 A | 8/1964 | Mackie | |
| 3,466,220 A * | 9/1969 | Allinikov et al. | 428/118 |
| 3,493,450 A * | 2/1970 | Judge, Jr. | 156/197 |
| 3,612,173 A | 10/1971 | Goyal | |
| 3,820,628 A | 6/1974 | Hanson | |
| 3,821,999 A | 7/1974 | Guess et al. | |
| 3,910,374 A | 10/1975 | Holehouse | |
| 3,917,193 A | 11/1975 | Runnels, Jr. | |
| 3,933,327 A | 1/1976 | Cook et al. | |
| 3,940,622 A | 2/1976 | Stallabrass et al. | |
| 3,948,346 A | 4/1976 | Schindler | |
| 3,976,270 A | 8/1976 | Catchpole | |

(Continued)

FOREIGN PATENT DOCUMENTS

DE   1 095 131   12/1960

(Continued)

OTHER PUBLICATIONS

AC Tech—Locations Page, Advanced Chemistry & Technology, ©AC Tech, Inc. 2000 (4 pages); http://www.actechaero.com/index7.html (Accessed Oct. 9, 2002).

(Continued)

*Primary Examiner*—Galen Barefoot
(74) *Attorney, Agent, or Firm*—Perkins Coie LLP

(57) ABSTRACT

A vessel, such as a wing-integrated aircraft fuel tank. The vessel can include a first surface portion, a second surface portion spaced apart from the first surface portion, and a core positioned between the first and second surface portions. The core can be sealably connected to the first and second surface portions and can be positioned to carry a load from at least one of the first and second surface portions to the other. The core can include a plurality of cells separated by cell walls, at least some of which have wall openings positioned to provide liquid communication between adjacent cells.

13 Claims, 5 Drawing Sheets

U.S. PATENT DOCUMENTS

| | | | |
|---|---|---|---|
| 4,032,090 A | 6/1977 | Thornton-Trump |
| 4,035,535 A | 7/1977 | Taylor |
| 4,152,938 A | 5/1979 | Danninger |
| 4,284,443 A | 8/1981 | Hilton |
| 4,304,376 A | 12/1981 | Hilton |
| 4,393,692 A | 7/1983 | Clark et al. |
| 4,475,624 A | 10/1984 | Bourland, Jr. et al. |
| 4,482,114 A | 11/1984 | Gupta et al. |
| 4,508,295 A | 4/1985 | Cattaneo et al. |
| 4,522,859 A | 6/1985 | Blair |
| 4,674,714 A | 6/1987 | Cole et al. |
| 4,688,745 A | 8/1987 | Rosenthal |
| 4,733,834 A | 3/1988 | Phillips, II |
| 4,738,416 A | 4/1988 | Birbragher |
| 4,743,740 A | 5/1988 | Adee |
| 4,749,150 A | 6/1988 | Rose et al. |
| 4,752,049 A | 6/1988 | Cole |
| 4,757,963 A | 7/1988 | Cole |
| 4,759,513 A | 7/1988 | Birbragher |
| 4,803,108 A | 2/1989 | Leuchten et al. |
| 4,850,093 A | 7/1989 | Parente |
| 4,890,494 A | 1/1990 | Osbond et al. |
| 4,907,449 A | 3/1990 | Call et al. |
| 4,925,721 A | 5/1990 | Harper-Tervet et al. |
| 4,926,963 A | 5/1990 | Snyder |
| 5,003,295 A | 3/1991 | Kleven |
| 5,006,391 A | 4/1991 | Biersach |
| 5,011,098 A | 4/1991 | McLaren et al. |
| 5,025,888 A | 6/1991 | Arcas et al. |
| 5,041,323 A | 8/1991 | Rose et al. |
| 5,041,324 A | 8/1991 | Siegling et al. |
| 5,088,277 A | 2/1992 | Schulze |
| 5,114,100 A | 5/1992 | Rudolph et al. |
| 5,243,185 A | 9/1993 | Blackwood |
| 5,257,498 A | 11/1993 | Nikkanen et al. |
| 5,365,731 A | 11/1994 | Nikkanen et al. |
| 5,398,547 A | 3/1995 | Gerardi et al. |
| 5,400,984 A | 3/1995 | Arnold et al. |
| 5,415,522 A | 5/1995 | Pla et al. |
| 5,423,658 A | 6/1995 | Pla et al. |
| 5,484,121 A | 1/1996 | Padawer et al. |
| 5,488,375 A | 1/1996 | Michie |
| 5,498,127 A | 3/1996 | Kraft et al. |
| 5,551,288 A | 9/1996 | Geraldi et al. |
| 5,575,440 A | 11/1996 | LeBlond et al. |
| 5,590,849 A | 1/1997 | Pla |
| 5,616,861 A | 4/1997 | Hagen |
| 5,619,144 A | 4/1997 | Stormbom |
| 5,644,080 A | 7/1997 | Stormbom et al. |
| 5,650,610 A | 7/1997 | Gagnon |
| 5,683,062 A | 11/1997 | Spiro et al. |
| 5,702,231 A | 12/1997 | Dougherty |
| 5,748,091 A | 5/1998 | Kim |
| 5,752,674 A | 5/1998 | Mears et al. |
| 5,776,579 A | 7/1998 | Jessup et al. |
| 5,777,481 A | 7/1998 | Vivekanandan |
| 5,814,137 A | 9/1998 | Blohowiak et al. |
| 5,841,079 A | 11/1998 | Parente |
| 5,849,110 A | 12/1998 | Blohowiak et al. |
| 5,869,140 A | 2/1999 | Blohowiak et al. |
| 5,869,141 A | 2/1999 | Blohowiak et al. |
| 5,874,672 A | 2/1999 | Gerardi et al. |
| RE36,215 E | 6/1999 | Rosenthal |
| 5,934,617 A | 8/1999 | Rutherford |
| 5,939,197 A | 8/1999 | Blohowiak et al. |
| 5,965,814 A | 10/1999 | French et al. |
| 6,037,060 A | 3/2000 | Blohowiak et al. |
| 6,049,282 A | 4/2000 | MacKenzie |
| 6,140,942 A | 10/2000 | Bragg et al. |
| 6,155,060 A | 12/2000 | Parkman |
| 6,194,685 B1 | 2/2001 | Rutherford |
| 6,211,494 B1 | 4/2001 | Giamati et al. |
| 6,237,874 B1 | 5/2001 | Rutherford et al. |
| 6,247,669 B1 | 6/2001 | Rauckhorst, III et al. |
| 6,263,680 B1 | 7/2001 | Newman et al. |
| 6,263,690 B1 | 7/2001 | Sokolean et al. |
| 6,304,194 B1 | 10/2001 | McKillip |
| 6,320,511 B1 | 11/2001 | Cronin et al. |
| 6,347,767 B1 | 2/2002 | Holmen |
| 6,609,592 B1 | 3/2002 | Wilson |
| 6,367,268 B1 | 4/2002 | Paul |
| 6,370,450 B1 | 4/2002 | Kromer et al. |
| 6,371,411 B1 | 4/2002 | Breer et al. |
| 6,430,996 B1 | 8/2002 | Anderson et al. |
| 6,457,676 B1 | 10/2002 | Breer et al. |
| 6,460,359 B1 | 10/2002 | Lauwers |
| 6,468,360 B1 | 10/2002 | Andrews |
| 6,490,876 B1 | 12/2002 | Derryberry et al. |
| 6,688,558 B1 | 12/2002 | Breer et al. |
| 6,592,963 B1 * | 7/2003 | Levit .......................... 428/116 |
| 6,827,180 B1 | 7/2003 | Wilson |
| 6,910,659 B1 | 4/2004 | Friddell et al. |
| 6,736,354 B1 | 5/2004 | Goto et al. |
| 6,767,129 B1 | 7/2004 | Lee et al. |
| 2004/0057495 A1 | 3/2004 | Lee et al. |
| 2004/0075027 A1 | 4/2004 | Friddell et al. |
| 2004/0095984 A1 | 5/2004 | Severson |
| 2004/0206854 A1 | 10/2004 | Shah |

FOREIGN PATENT DOCUMENTS

| | | |
|---|---|---|
| DE | 3506317 C1 | 2/1986 |
| EP | 0 509 166 A1 | 10/1992 |
| EP | 0 893 342 A2 | 1/1999 |
| GB | 609314 | 9/1945 |
| GB | 674750 | 7/1952 |
| GB | 2158939 A | 11/1985 |
| WO | WO-04/110865 A1 | 12/2004 |
| WO | WO-05/020175 A1 | 3/2005 |

OTHER PUBLICATIONS

Advanced Chemistry & Technology, AC™-130, Surface Preparation for Bonding (2 page).

Aeronca Inc., Magellan Aerospace Corporation, Brazed Structures, © Feb. 2002 Magellan Aerospace Corporation (2 pages), http://www.aeroncainc.com/aeronca_bs.html [Accessed Oct. 8, 2002].

ALCORE, Trussgrid—Three Dimensional Honeycomb, © 1999 Alcore, Inc. (2 pages).

Cytec—Product Information, Cytec—Aerospace and Engineered Materials (3 pages); http://www.cytec.com/products4/aeropsacemenu.html [Accessed Oct. 8, 2002].

European Search Report, The Boeing Company, European Patent Application No. 03 07 8176, Dec. 12, 2003 (2 pgs.).

GOODRICH Aerostructures Group, Advanced Processes, 201 2001, 2002 Goodrich Corporation, (1 page); http://www.rohr.com/html/rd_advanced.html [Accessed Oct. 8,2002].

Metallic Honeycomb (3 pages), http://www.honeycombone.com/metallic.htm [Accessed Oct. 8, 2002].

Schwartz, Jody, " Keep on Truckin': SIA Adhesives, a Sovereign Speciality Chemicals Subsidiary, Provides the Bond for General Motors' New Composite Truck Box," Adhesives Age, Oct. 5, 2000 (2 pages).

Torayca Prepreg Products, "Toray" (3 pages); http://www.torayusa.com/tca/products/prepreg.htm [Accessed Oct. 8, 2002].

U.S. Appl. No. 11/094,916, filed Mar. 30, 2005, Breer.

Dean, P. D., "On the 'In-Situ' Control of Acoustic Liner Attenuation", Journal of Engineering for Power, Jan. 1977, pp. 63-70, American Society of Mechanical Engineers, N.Y.

Elliot Aviation, "New System Warns King Air Pilots of Inflight Icing," Wavelink News Magazine, Wavelink Articles, 2 pages, http://www.elliottaviation.com/wavelink/1998q2/wavart03A.asp [accessed Nov. 20, 2002].

European Search Report, European Patent Application No. EP 00 20 4171, Search Completed Jan. 17, 2001 (3 Pages).

Hwang, D.P., "A Proof of Concept Experiment for Reducing Skin Friction By Using a Micro-Blowing Technique", NASA Technical Memorandum 107315, AIAA-97-0546, 35th Aerospace Sciences Meeting and Exhibit, American Institute of Aeronautics and Astronautics, Reno, Nevada, Jan. 6-9, 1997 (13 Pages).

Ingard, U. et al., "Acoustic Nonlinearity of an Orifice," The Journal of the Acoustical Society of America, vol. 42, No. 1, 1967, pp. 6-17.

Kim, J.J., "Heat Transfer Model of a Jet Pump Cowl Anti-Ice System," 1996 World Aviation Congress, SAE International and American Institute of Aeronautics and Astronautics, Los Angeles, California, Oct. 21-24, 1996, pp. 1-15.

SEA International, "Aircraft Ice Detectors and Icing Rate Measuring Instruments," SEA AIR4367, Aerospace Information Report, Issued Apr. 1994, Society of Auomotive Engineers, Inc., USA.

VOLVO, "Volvo S70 & V70 Manual," Volvo Car Corporation, 1998, Goteborg, Sweden (3 Pages).

\* cited by examiner

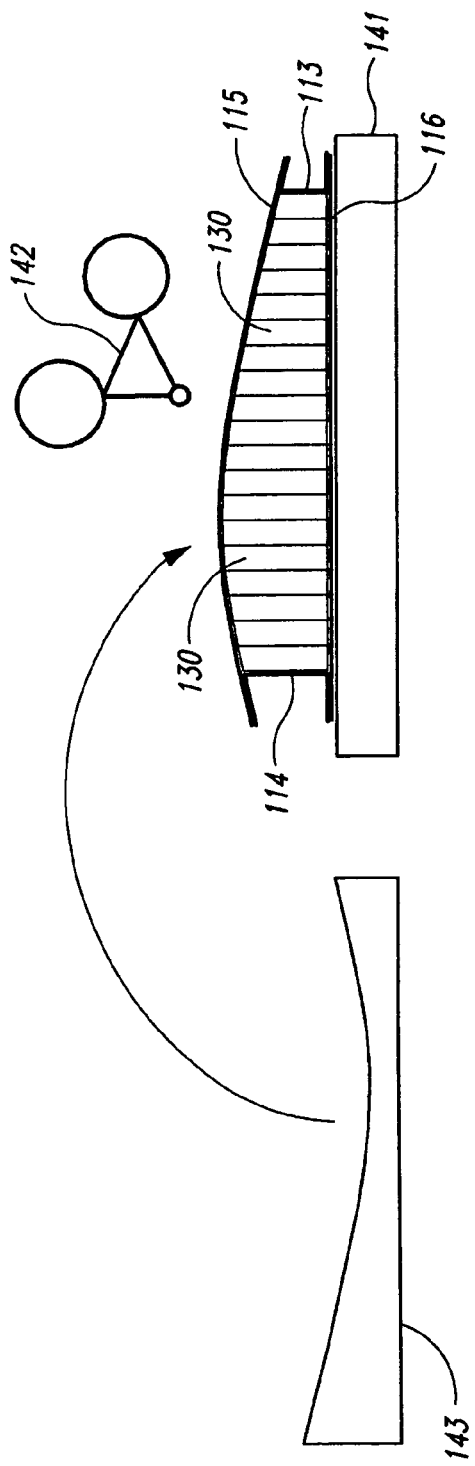
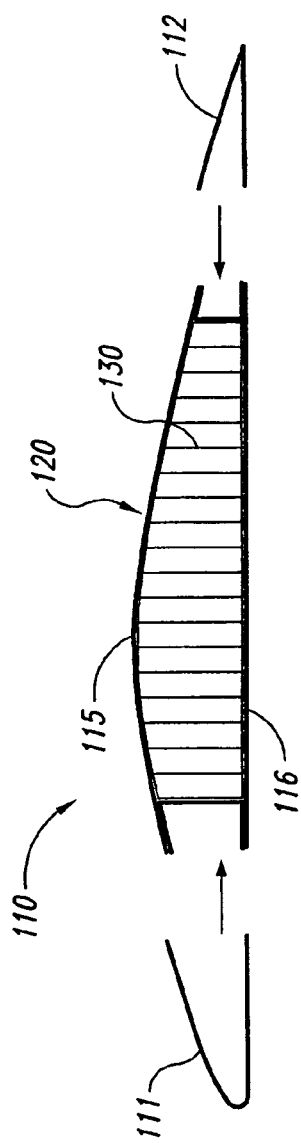
Fig. 5C
Fig. 5D

METHOD AND APPARATUS FOR LIQUID CONTAINMENT, SUCH AS FOR AIRCRAFT FUEL VESSELS

CROSS-REFERENCE TO RELATED APPLICATION

This application is a divisional of U.S. application Ser. No. 10/278,585, filed Oct. 22, 2002 now U.S. Pat. No. 6,910,659, which is incorporated herein by reference.

TECHNICAL FIELD

The following disclosure relates generally to methods and apparatus for containing liquids, such as aircraft fuels.

BACKGROUND

Aircraft fuel is typically carried in fuel vessels located within the wings of the aircraft. One typical method for manufacturing aircraft fuel vessels is to manufacture the wing with a sealed, central wing box defined by wing upper and lower surfaces, forward and aft wing spars, inboard and outboard stringers and ribs. These components, typically formed from aluminum, are connected with fasteners, such as rivets. The resulting fuel vessel is then outfitted with multiple access panels that can be opened to (a) allow an operator to seal and/or re-seal the internal joints and (b) allow an inspector to visually inspect the joints for possible corrosion over the life of the aircraft.

One limitation with the foregoing approach is that it is generally not practical for constructing very thin wings, such as the wings typically designed for high-speed (near sonic and supersonic) flight. For example, thin wings require numerous access panels to allow adequate access for sealing and inspection. The additional weight of these access panels is typically prohibitive. Accordingly, thin wings or thin wing portions are generally not suitable for fuel storage.

Another approach for forming airfoil components, such as tails and wing sections, is to bond a metal or fiber reinforced plastic honeycomb core between the airfoil upper and lower surfaces, in place of the foregoing spars, ribs and stringers. The entire assembly is then cured in an autoclave to form a monolithic structure. One drawback with this approach, however, is that the core is not suitable for fuel storage because the cell openings of the core (oriented normal to the airfoil upper and lower surfaces) run transverse to the desired fuel flow direction, which is from outboard to inboard.

SUMMARY

The present invention is directed toward methods and apparatuses for containing liquids, such as aircraft fuels. A vessel in accordance with one aspect of the invention includes a first surface portion, a second surface portion spaced apart from the first surface portion, and a core positioned between the first and second surface portions. The core can be sealably connected to the first and second surface portions and can be positioned to carry a load from at least one of the surface portions to the other. The core can include a plurality of cells separated by cell walls, with at least some of the cell walls having wall openings positioned to provide liquid communication between adjacent cells.

An airfoil in accordance with another aspect of the invention includes a first wing portion having a first external surface and a first internal surface, a second wing portion having a second external surface and a second internal surface, with the second internal surface spaced apart from the first internal surface, and a core positioned between the first and second wing portions. The core can be sealably connected to the first and second wing portions to form a fuel volume. The core can be positioned to carry a load from at least one of the wing portions to the other and can include a plurality of cells separated by cell walls, at least some of which have wall openings positioned to provide liquid communication between adjacent cells. A fuel port can be positioned in liquid communication with the fuel volume, and can be coupleable to an aircraft engine.

A method in accordance with another aspect of the invention includes positioning a first surface portion spaced apart from the second surface portion, and positioning a core between the first and second surface portions. The core can include a plurality of cells separated by cell walls, at least some of which have wall openings to provide liquid communication between adjacent cells. The method can further include sealably connecting the core to the first and second surface portions to form at least a portion of a fluid-tight volume between the first and second surface portions, with the core positioned to carry a load from at least one of the surface portions to the other.

BRIEF DESCRIPTION OF THE DRAWINGS

FIGS. 5A–5D illustrate a process for forming a wing integrated fuel vessel with a perforated core in accordance with an embodiment of the invention.

DETAILED DESCRIPTION

The present disclosure describes methods and apparatuses for containing liquids (such as fuels) in vessels, such as aircraft wing tanks. Many specific details of certain embodiments of the invention are set forth in the following description and in FIGS. 1–5D to provide a thorough understanding of these embodiments. One skilled in the art, however, will understand that the present invention may have additional embodiments, and that the invention may be practiced without several of the details described below.

Figure 1:
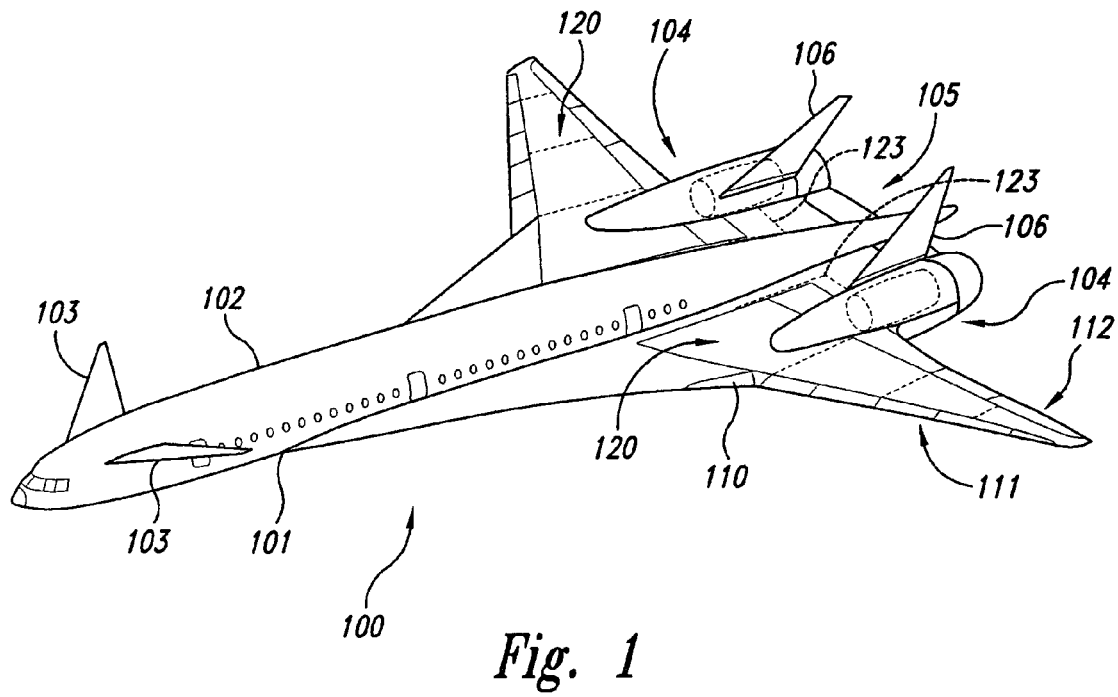
FIG. 1 is a partially schematic, isometric view of an aircraft having wing-integrated fuel vessels in accordance with an embodiment of the invention.

FIG. 1 is a partially schematic, top isometric view of a vehicle 100, such as an aircraft 101 having a fuselage 102 and a wing 110 configured in accordance with an embodiment of the invention. In one aspect of this embodiment, the aircraft 101 includes dual propulsion systems 104 integrated with the wing 110. Tails 106 extend upwardly from the propulsion systems 104 (for yaw axis stability and control), and a generally flat aft body 105 is positioned between the propulsion systems 104 and the fuselage 102 (for pitch axis stability and control). Canards 103 mounted forward of the wing 110 provide for additional pitch axis stability and control. Leading edge devices 111 and trailing edge devices 112 provide still further pitch axis control authority. One or more vessels 120, such as fuel vessels, can be positioned between the leading edge devices 111 and the trailing edge devices 112 and can be integrated with the wing 110. The vessels 120 can be coupled to the propulsion systems 104 with the fuel lines 123 to provide a suitable fuel flow rate to the propulsion systems 104. Further details of embodiments of the vessels 120 and corresponding methods of construction are described below with reference to FIGS. 2–5B.

Figure 2:
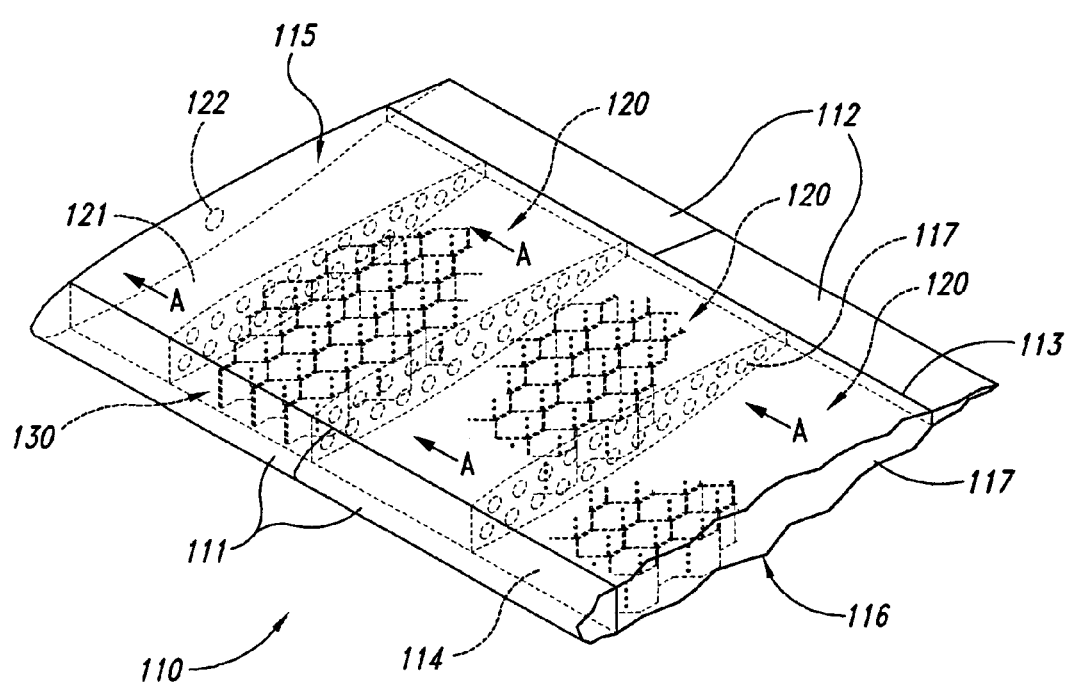
FIG. 2 is a partially schematic illustration of a portion of a wing having integrated fuel vessels in accordance with an embodiment of the invention.

FIG. 2 is a partially schematic, top isometric view of a portion of the wing 110 having a plurality of vessels 120 arranged in accordance with an embodiment of the invention. In one aspect of this embodiment, the wing 110 can include a first or upper surface portion 115 and a second or lower surface portion 116 spaced apart from the first surface portion 115. A forward spar 114 and an aft spar 113 can extend between the first surface portion 115 and the second surface portion 116. Intermediate portions 117 can extend longitudinally from the forward spar 114 to the aft spar 113. Accordingly, the intermediate portions 117, the forward and aft spars 114, 113 and the first and second surface portions 115, 116 can define the boundaries of a plurality of vessels 120, three of which are shown in FIG. 2. In other embodiments, the wing 110 can include more or fewer vessels 120. For example, in one particular embodiment, the wing 110 can include a single vessel 120 on each side of the fuselage 102.

In one aspect of the foregoing embodiments, the vessels 120 (in wings having a plurality of such vessels) can be in fluid communication with each other. In other embodiments, each vessel 120 can be isolated from its neighbors. In another aspect of these embodiments, the vessel or vessels 120 can drain fuel into a collection chamber 121 positioned adjacent to one of the vessels 120, as indicated by arrows A. The fuel collected in the collection chamber 121 can exit through a fuel port 122 into a fuel line 123 for delivery to the propulsion systems 104 (FIG. 1).

In one aspect of the foregoing embodiments, each vessel 120 includes a core 130 (portions of which are shown in FIG. 2, not necessarily to scale) positioned between inward facing surfaces of the first and second surface portions 115, 116. The core 130 can provide structural support for the wing 110 and can also be perforated to allow the flow of fuel within the wing 110. Further aspects of the core 130 are described in greater detail below with reference to FIG. 3.

Figure 3:
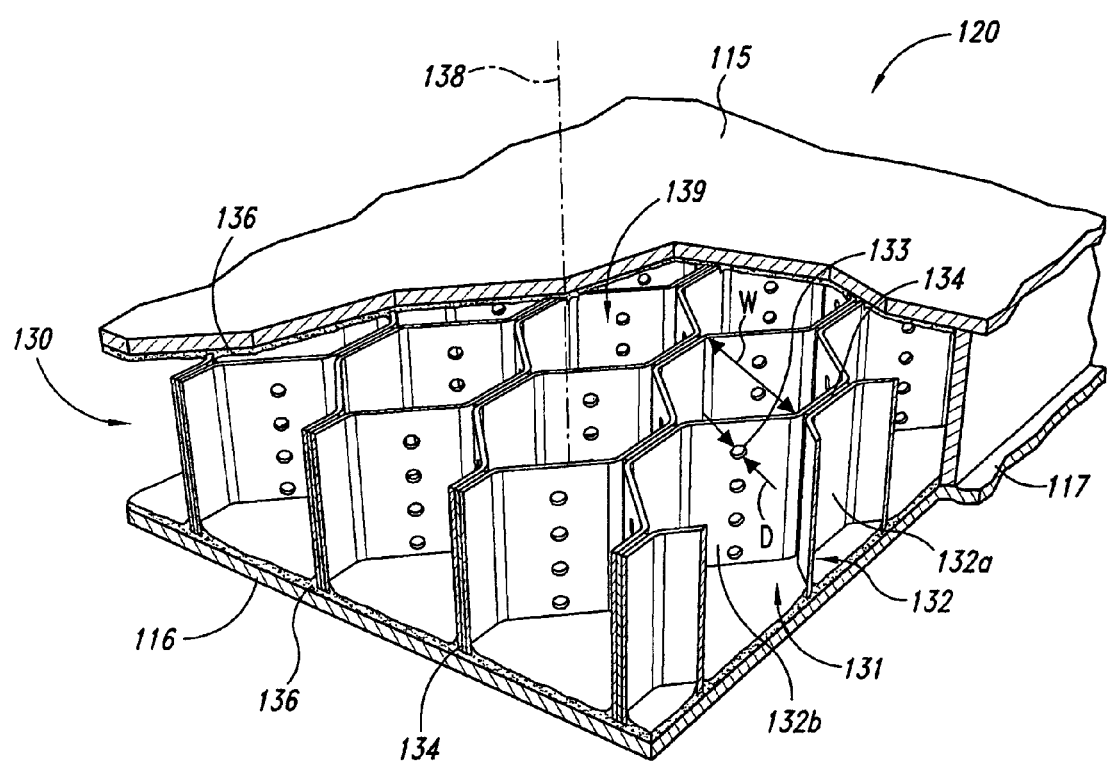
FIG. 3 is a partially cutaway, top isometric view of a portion of the fuel vessel shown in FIG. 2.

FIG. 3 is a partially cutaway, isometric view of a portion of one of the vessels 120 described above with reference to FIG. 2, configured in accordance with an embodiment of the invention. In one aspect of this embodiment, the core 130 within the vessel 120 is sealed to the first surface portion 115, the second surface portion 116, the intermediate portion 117 and the spars 114, 113 (FIG. 2) with a sealant 136. The sealant 136 can provide a liquid-tight bond among these components. In a further aspect of this invention, the core 130 includes a plurality of cells 131, each having a cell opening 139 aligned along a corresponding cell axis 138. The cells 131 are separated by and defined by cell walls 132, which provide stiffness in a direction aligned with the cell axis 138. The cell walls 132 can include bonded walls 132a and free walls 132b. The bonded walls 132a of each cell 131 can be bonded to the adjacent bonded walls 132a of the neighboring cell 131 with a bond 134. The free walls 132b are positioned between the bonded walls 132a.

In a further aspect of this embodiment, at least some of the cell walls 132 include wall openings 133. The wall openings 133 are sized to allow the free flow of a liquid (such as jet fuel) from one cell 131 to its neighbor. In one embodiment, only the free walls 132b include wall openings 133, so as not to affect the integrity of the bond 134 formed between adjacent bonded walls 132a. In another embodiment, the bonded walls 132a can include wall openings 133 in addition to or in lieu of the wall openings 133 in the free walls 132b.

In one embodiment, the wall openings 133 can be round and can have a relatively large diameter D of about 0.125 inch or greater. In another embodiment, the diameter D of the wall openings 133 can depend upon a width W of the cell 131 in which it is positioned. For example, in a particular aspect of this embodiment, the diameter D of the wall openings 133 can be approximately one quarter or more of the width W of the corresponding cell 131. In other embodiments, the wall opening 133 can have other dimensions and/or shapes. In any of these embodiments, the wall openings 133 can be large enough to allow liquid to flow from cell to cell.

In one aspect of this embodiment, the wall bond 134 between adjacent bonded walls 132a can include an adhesive, for example, when the cell walls 132 are formed from a plastic. In another aspect of this embodiment, the wall bonds 134 can include brazed or welded joints, for example, when the cell walls 132 are metallic. In other embodiments, the wall bonds 134 can include other constructions.

In still a further aspect of the foregoing embodiments, each perforated cell wall 132 can include a plurality of wall openings 133. For example, as shown in FIG. 3, each free wall 132b can include four wall openings 133 arranged generally along the cell axis 138. In other embodiments, each perforated cell wall 132 can include more or fewer wall openings 133, depending, for example, on the size of the wall openings 133 relative to the size of the cell walls 132. An advantage of any of these arrangements is that liquid within each cell 131 can continue to drain to its neighbor as the overall level of liquid within the vessel 120 decreases. A further advantage of this arrangement is that the plurality of wall openings 133 can provide redundant avenues by which liquid can move from one cell 131 to the next. Still a further advantage of this arrangement is that the cells 131 can be self-draining, i.e., they can drain under the force of gravity and without active pumping.

One feature of an embodiment of the vessel 120 described above with reference to FIGS. 1–3 is that it includes a perforated core 130. An advantage of this feature is that the core 130 can allow liquid to flow through the vessel 120 while withstanding shear loads applied to either of the surface portions 115, 116. The core 130 can also transfer the shear loads from one surface portion to the other. Accordingly, the core 130 can be generally rigid, e.g., the core 130 can flex with the wing 110 as the wing is loaded, but can remain generally stationary relative to the surface portions 115, 116.

Another feature of the foregoing embodiments is that the core 130 can provide an additional margin of safety in the event the vessel 120 is punctured. For example, the walls 132 of the core 130 can limit the rate at which fuel (or another liquid) escapes from the vessel 120. The core 130, which has a great deal of surface area, can also act as a heat sink, reducing and/or eliminating the likelihood for fuel to explode while the fuel is within the vessel 120 for example, in the event of a crash or lightening strike. In another embodiment, the core 130 can be replaced with a metallic (or other heat conducting) element that similarly dissipates heat (and can accordingly prevent an explosion in the vessel 120), but that provides reduced and/or non-existent structural support. Such an element can include a wire mesh or screen-type material, or another porous material. The heat conducting element can also include a conventional metal core-type material oriented orthogonal to the arrangement shown in FIGS. 1–3, to allow fuel to flow through the cell openings 139. In any of these embodiments, other elements such as spars, stringers and ribs, provide structural support for the wing 110.

Another feature of the foregoing embodiments is that, as described in greater detail below with reference to FIGS. 4A–5B, the vessel components, (including the core 130, the surface portions 115, 116 and the intermediate portion 117) can be bonded to form a liquid-tight vessel 120 suitable for containing aircraft fuel, without requiring access panels. Instead, non-invasive techniques can be used to periodically assess the integrity of the bonds formed within the vessel 120. Such techniques include through-transmission ultrasonic techniques, pulse-echo sonic techniques, and x-ray visualization.

Figure 4A:
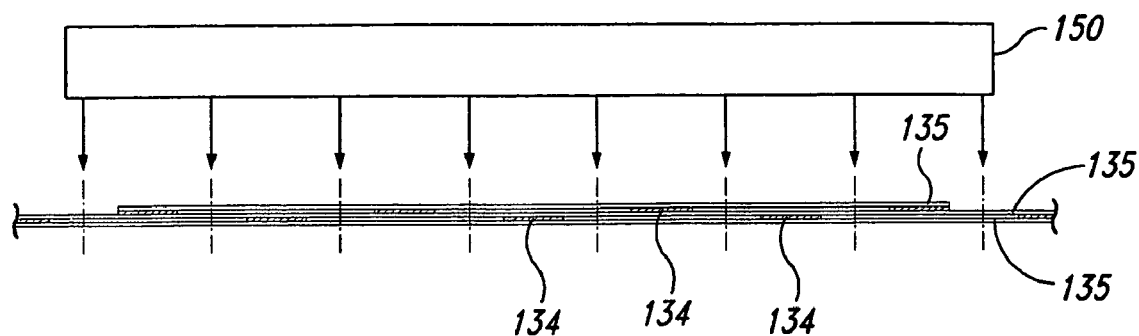
FIGS. 4A–4B illustrate the formation of a core suitable for use in a vessel in accordance with an embodiment of the invention.
Figure 4B:
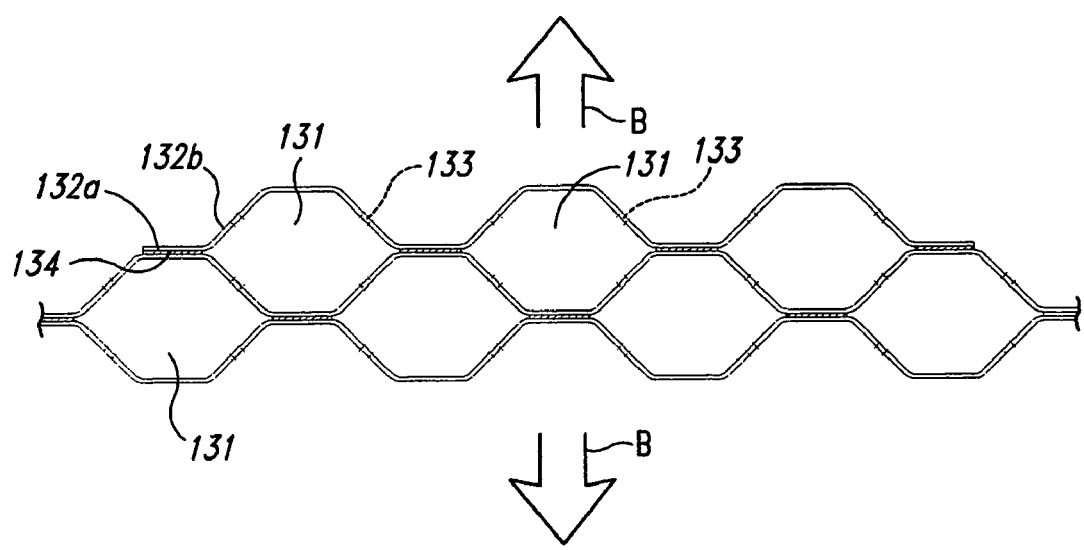

FIGS. 4A–4B illustrate a technique for forming a core 130 in accordance with an embodiment of the invention. In one aspect of this embodiment, a plurality of sheets 135 (such as foil sheets) are laid flat upon each other and bonded with the wall bonds 134 described above with reference to FIG. 3. A piercing device 150 (such as a mechanical, laser or ultrasonic drill) simultaneously pierces the stacked sheets 135 in between and/or at the wall bonds 134. The stack of sheets 135 is then expanded or pulled apart, as indicated by arrows B in FIG. 4B to produce the core 130 having corresponding wall openings 133. In another embodiment, (particularly suitable when the sheets 135 are metallic), each sheet 135 can be perforated when flat, then hot-formed to produce a shape such as that shown in FIG. 4B, and then bonded to the neighboring sheet, for example, by brazing or welding. In still another embodiment, the sheets 135 can include a fiber reinforced plastic paper composite, perforated, then bonded at the wall bonds 134, and then expanded and coated with resin.

In one aspect of the foregoing embodiments, the cells 131 can have hexagonal shapes, as shown in FIG. 4B. In other embodiments, the cells 131 can have other conventional shapes and arrangements, such as a reinforced hexagonal shape, an overexpanded shape, a square shape, a Flex-Core™ arrangement, a Doubleflex-Core™ arrangement, a spirally wrapped (Tube-Core™ arrangement), or a Cross-Core™ arrangement, many of which are available from Hexcell Composites of Dublin, Calif. In other embodiments, the cells 131 can have still other shapes.

Figure 5A:
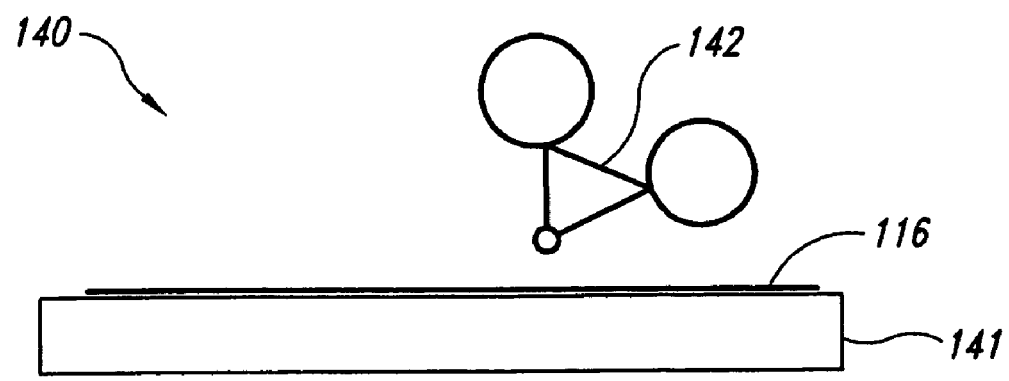
Figure 5B:
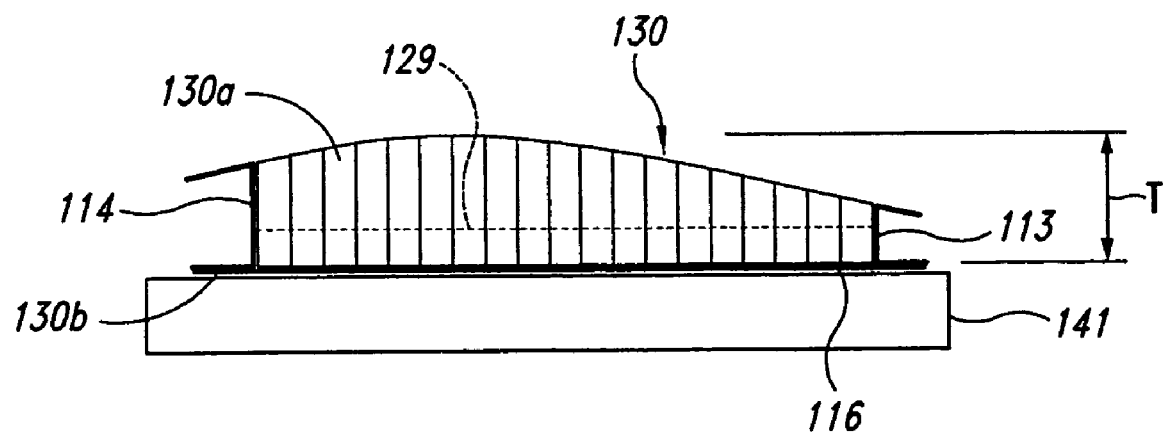

FIGS. 5A–5D illustrate a technique for forming a wing-integrated vessel in accordance with an embodiment of the invention. Beginning with FIG. 5A, in one aspect of this embodiment, the second surface portion 116 is formed on a second surface tool 141 of a lay-up apparatus 140. In one aspect of this embodiment, the lay-up apparatus 140 can include a tape lamination device 142 which lays strips of tape on the second surface tool 141 to build up the second surface portion 116. As shown in FIG. 5B, a pre-formed forward spar 114 and a pre-formed aft spar 113 can then be positioned on the second surface portion 116 adjacent to the core 130. In one embodiment, for example, when the core 130 has a thickness T of less than about 12 inches, the core 130 can include a single, unitary structure. In another embodiment, for example, when the thickness T of the core 130 is greater than about 12 inches, the core 130 can include initially separate upper and lower portions 130a, 130b, joined by a septum 129. These components bond together with each other and the remaining components of the wing as described in greater detail below with reference to FIG. 5C.

Referring now to FIG. 5C, the first surface portion 115 is next positioned on the core 130 and the forward and aft spars 114, 113. In one embodiment, the first surface portion 115 is laid up directly onto the core 130 with the tape lamination device 142. In another embodiment, the first surface portion 116 is first laid up on a first surface tool 143 and then transferred to the core 130. In either of these embodiments, a caul plate (having a contact surface with a shape generally similar to that of the first surface tool 143) is then positioned against the first surface portion 115 during curing to provide support for the first surface portion 115. In still a further embodiment, the first surface portion 115 and the first surface tool 143 can be placed together on the core 130. In any of these embodiments, the assembly of components, including the second surface tool 141 and the first surface tool 143 (or corresponding caul plate) are bagged and heated to bond the components together and cure the adhesives between the components. As shown in FIG. 5D, leading edge devices 111 and trailing edge devices 112 can then be attached to form a complete wing 110 with integral fuel tank 120.

In one embodiment, the core 130 can include welded titanium or titanium alloy sheets 135. In another embodiment, the core 130 can include brazed aluminum or aluminum alloy sheets 135. In still a further embodiment, the core 130 can include a carbon fiber reinforced epoxy construction. In any of these embodiments, the core 130 can be cleaned (for example, with an aqueous degreaser), etched (for example, with a nitric fluoride solution), conditioned and rinsed. The core 130 can then be treated with a conversion coating, such as a sol gel, available from the assignee of the present invention or Advanced Chemistry & Technology of Garden Grove, Calif. The first and second surface portions 115, 116 can include carbon fiber prepreg materials, such as are available from Toray Composites (America) Inc. of Tacoma, Wash. The entire assembly can be vacuum bagged and cured in an autoclave at 350° for two hours with the vacuum bag vented to atmospheric pressure, or under continuous vacuum. Further details of aspects of the foregoing materials and processes are disclosed in the following U.S. Patents, all of which are incorporated herein in their entireties by reference: U.S. Pat. Nos. 6,394,394; 6,224,020; 6,037,060; 5,958,578; 5,939,197; 5,869,141; 5,869,140; 5,849,110 and 5,814,137.

In other embodiments, the techniques described above can be used to manufacture vessels for use in applications other than aircraft wing fuel vessels. For example, these techniques can be used to form integral fuel vessels in other aircraft components, such as the canards, tails, aft bodies or other features described above with reference to FIG. 1. In further embodiments, the fuel vessels can be incorporated into aircraft having configurations other than that shown in FIG. 1. In still further embodiments, any of these vessels can be used to contain fluids other than aviation fuel. In yet further embodiments, these vessels can be incorporated into vehicles other than an aircraft. For example, these vessels can be incorporated into vehicles such as cars, trucks, trains, boats, or motorcycles. For any of these vehicles, an advantage of embodiments of the foregoing arrangement is that the vessels can provide a load carrying capability and can reduce the likelihood of a fire or explosion in the event the vessel is pierced. In still further embodiments, the vessels can be used for applications other than vehicles, such as stationary tanks for containing fuels or other liquids. In any of these embodiments, the first and second surface portion can be spaced apart from each other (to allow room for the core) while also being connected. For example, the first and second surface portions can be parts of a single, integral sheet or panel.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for forming an airfoil, comprising:
   positioning a first surface portion spaced apart from a second surface portion;
   positioning a core between the first and second surface portions and outboard a collection chamber in the airfoil, the core including a plurality of cells separated by cell walls, at least some of the cell walls having wall openings to provide liquid communication between adjacent cells and between the collection chamber and the core; and
   sealably connecting the core to the first and second surface portions to form at least part of a fluid-tight volume between the first and second surface portions, with the core positioned to carry a load from at least one of the first and second surface portions to the other.

2. The method of claim 1 wherein sealably connecting the core to the first and second surface portions includes adhesively bonding the core to the first and second surface portions.

3. The method of claim 1, further comprising perforating the cell walls to form the wall openings.

4. The method of claim 1, further comprising expanding the core from an initially collapsed state to an expanded state after perforating the cell walls and before positioning the core between the first and second surface portions.

5. The method of claim 1 wherein the core includes cells having cell openings elongated along corresponding cell axes, and wherein positioning the core includes positioning the core with the cell axes extending generally transverse to at least one of the first and second surface portions.

6. The method of claim 1 wherein positioning a core includes positioning a core that is generally rigid in a direction generally transverse to at least one of the first and second surface portions.

7. The method of claim 1, further comprising disposing a fuel port in liquid communication with the fuel-tight volume.

8. The method of claim 1 wherein positioning a core includes positioning a core having wall openings with a diameter of approximately 0.125 inch or greater.

9. The method of claim 1 wherein positioning a core includes positioning a core having cells with a width generally transverse to at least one of the first and second surface portions, and wherein the wall openings have a diameter of approximately one quarter of the width or greater.

10. A method for forming aircraft components, comprising:
    positioning a first wing portion having a first external surface and a first internal surface to be proximate to a second wing portion having a second external surface and a second internal surface, with at least part of the second internal surface being spaced apart from at least part of the first internal surface;
    positioning a core between the first and second wing portions, the core including an outboard portion, an inboard portion, and a plurality of at least generally similarly sized and shaped cells separated by cell walls, at least some of the cell walls having wall openings positioned to provide liquid communication between adjacent cells, the wall openings being sized and configured such that fuel flow through the wall openings from the outboard portion to the inboard portion provides sufficient fuel for operation of an aircraft engine;
    sealably connecting the core to the first and second wing portions to form at least part of a fuel-tight volume, the core being positioned to carry a load from at least one of the first and second wing portions to the other; and
    coupling a fuel port in liquid communication with the fuel volume, the fuel port being coupleable to the aircraft engine.

11. The method of claim 10, further comprising connecting the first and second wing portions to an aircraft fuselage.

12. The method of claim 10, further comprising:
    sealably coupling a first intermediate panel between the first and second wing portions; and
    sealably coupling a second intermediate panel between the first and second surface portions, with the second intermediate panel spaced apart from the first intermediate panel, and with at least a portion of the core positioned between the first and second intermediate panels.

13. The method of claim 10, further comprising coupling a fuel conduit in liquid communication with the fuel volume.

* * * * *